(12) United States Patent
Soshi (10) Patent No.: US 9,606,852 B2
(45) Date of Patent: Mar. 28, 2017

(54) MICROCONTROLLER AND METHOD FOR CONTROLLING PERIPHERAL CIRCUITS

(71) Applicant: CASIO COMPUTER CO., LTD., Tokyo (JP)

(72) Inventor: Masato Soshi, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 116 days.

(21) Appl. No.: 14/590,815

(22) Filed: Jan. 6, 2015

(65) Prior Publication Data

US 2015/0193292 A1  Jul. 9, 2015

(30) Foreign Application Priority Data

Jan. 9, 2014 (JP) ................................. 2014-002725

(51) Int. Cl.
*G06F 11/20* (2006.01)
*G06F 11/07* (2006.01)

(52) U.S. Cl.
CPC ...... *G06F 11/0772* (2013.01); *G06F 11/0745* (2013.01); *G06F 11/2025* (2013.01); *G06F 11/2033* (2013.01)

(58) Field of Classification Search
CPC .... G06F 11/0772; G06F 11/20; G06F 11/202; G06F 11/2023; G06F 11/2025; G06F 11/2033
See application file for complete search history.

(56) References Cited

U.S. PATENT DOCUMENTS

| | | | | |
|---|---|---|---|---|
| 6,735,720 B1 * | 5/2004 | Dunn | .................. | G06F 11/0745 714/43 |
| 7,707,349 B1 * | 4/2010 | Keithley | ............... | G06F 13/385 358/1.1 |
| 2002/0120794 A1 * | 8/2002 | Jirgal | ...................... | G06F 13/28 710/25 |

(Continued)

FOREIGN PATENT DOCUMENTS

| JP | 04-117585 A | 4/1992 |
|---|---|---|
| JP | 2008-250987 A | 10/2008 |

OTHER PUBLICATIONS

Understanding MCU Sleep Modes and Energy Savings by Anders Guldahl, Mar. 6, 2012 http://www.embedded.com/design/power-optimization/4237635/Understanding-MCU-sleep-modes-and-energy-savings#.*

(Continued)

*Primary Examiner* — Joseph Schell
(74) *Attorney, Agent, or Firm* — Chen Yoshimura LLP (57) ABSTRACT

In one aspect, the present disclosure provides a microcontroller device that has, in one chip: a central processing unit; a plurality of peripheral circuits configured to execute respective prescribed processes in response to corresponding trigger signals; and a peripheral control unit that controls respective activations of the plurality of peripheral circuits, wherein at least one of the peripheral circuits is configured to: control operation of an external device; determine whether or not the operation of the external device has ended without an error; enter a standby mode to accept a next trigger signal when the operation of the external device ended without an error; and generate an interrupt signal to interrupt the central processing unit when the operation of the external device ended with an error.

7 Claims, 9 Drawing Sheets

(56) References Cited

U.S. PATENT DOCUMENTS

| | | | |
|---|---|---|---|
| 2003/0056036 A1* | 3/2003 | Carlton | G06F 11/221 710/15 |
| 2005/0187663 A1* | 8/2005 | Heidemann | G05B 23/0283 700/266 |
| 2008/0221708 A1 | 9/2008 | Oyama et al. | |
| 2015/0039944 A1* | 2/2015 | Vilela | G06F 11/16 714/43 |

OTHER PUBLICATIONS

Wikipedia's Direct Memory Access historical version from Dec. 22, 2013 https://en.wikipedia.org/w/index.php?title=Direct_memory_access&oldid=587276274.*

Japanese Office Action dated Dec. 8, 2015, in a counterpart Japanese patent application No. 2014-002725.

* cited by examiner

| Signal Origin | | Trigger Output Destination |
|---|---|---|
| Peripheral | Input Signal | Peripheral |
| First Timer/Counter | Timer Counter Termination | First Serial I/F |
| First DMA Controller | DMA Transfer Termination | Second Timer/Counter |
| Second Timer/Counter | Counter Number Coincidence | Second Serial I/F |
| Second DMA Controller | DMA Transfer Termination | Third Timer/Counter |

MCU (First Serial I/F) ⇔ Sensor

FIG. 9B

First Serial I/F In MCU ⇉ RAM

FIG. 10A

MCU (Second Serial I/F) ⇔ Flash ROM

FIG. 10B

RAM in MCU ⇌ Second Serial I/F

MICROCONTROLLER AND METHOD FOR CONTROLLING PERIPHERAL CIRCUITS

BACKGROUND OF THE INVENTION

Technical Field

The present invention relates to a microcontroller device and a controlling method performed therein.

Background Art

Technology has been previously proposed for providing a microcontroller that does not need additional buffer circuits added thereto, even when connecting a plurality of microcomputers. This technology has a plurality of peripheral circuits, a buffer circuit provided between these peripheral circuits and an input/output terminal, and a control circuit that controls the conductance of the buffer circuit in accordance with external signals (see Japanese Patent Application Laid-Open Publication No. 04-117585, for example).

Various types of microcomputers (hereinafter, "microprocessors"), including the Patent Document above, have been proposed that are embedded in various types of electronic devices and that take compatibility with parallel circuits into consideration.

In these types of microcontrollers, timers and various types of external interfaces are provided along with the CPU (central processing unit) in a single chip.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a microcontroller device including, in one chip: a central processing unit; a plurality of peripheral circuits configured to execute respective prescribed processes in response to corresponding trigger signals; and a peripheral control unit that controls respective activations of the plurality of peripheral circuits, wherein at least one of the peripheral circuits is configured to: control operation of an external device; determine whether or not the operation of the external device has ended without an error; enter a standby mode to accept a next trigger signal when the operation of the external device ended without an error; and generate an interrupt signal to interrupt the central processing unit when the operation of the external device ended with an error.

In another aspect, the present disclosure provides a controlling method for a microcontroller device that has, in one chip, a central processing unit, a plurality of peripheral circuits configured to respectively execute prescribed processes in response to corresponding trigger signals, and a peripheral control unit that controls respective activations of the plurality of peripheral circuits, wherein at least one of the peripheral circuits controls operation of an external device, the control method being performed within the at least one of the peripheral circuits that controls the operation of the external device, and including: determining whether or not the operation of the external device has ended without an error; entering a standby mode to accept a next trigger signal when the operation of the external device ended without an error; and generating an interrupt signal to interrupt the central processing unit when the operation of the external device ended with an error.

It is to be understood that both the foregoing general description and the following detailed description are exemplary and explanatory, and are intended to provide further explanation of the invention as claimed.

DETAILED DESCRIPTION OF THE PREFERRED EMBODIMENTS

A microcontroller device (hereinafter, "MCU") according to one embodiment of the present invention will be described below.

Figure 1:
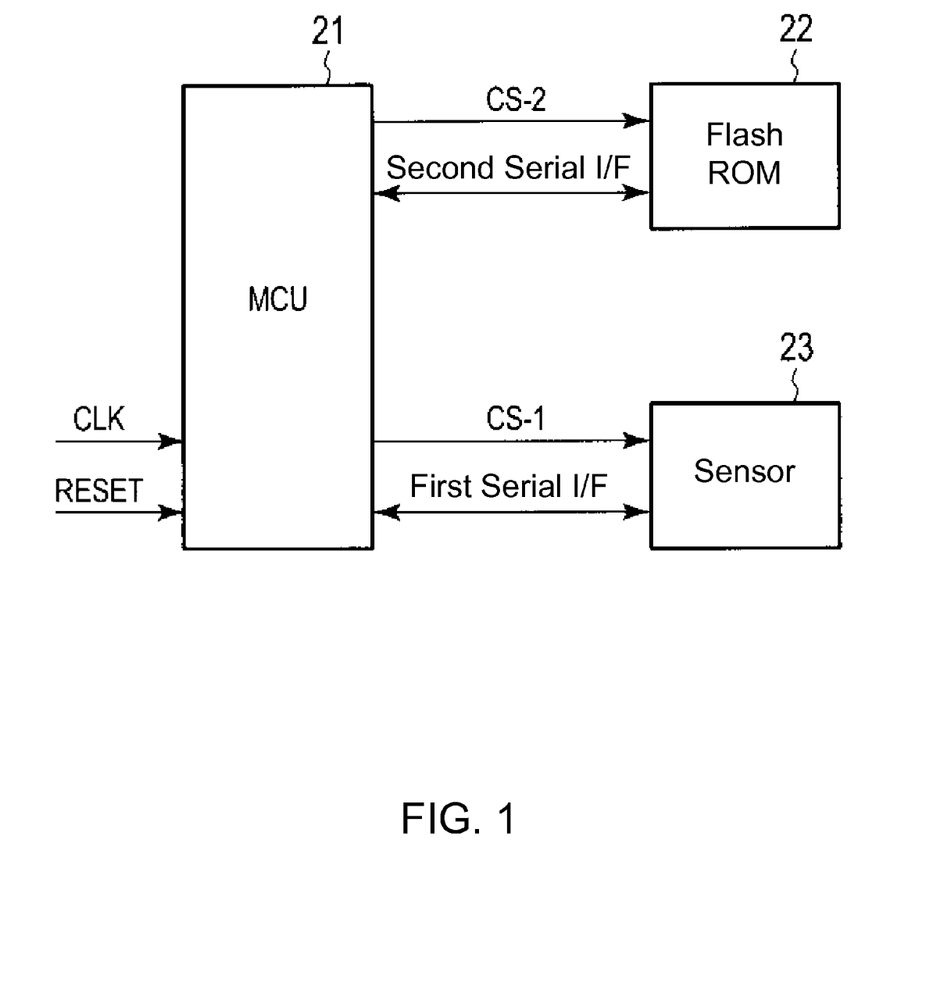
FIG. 1 is a block view of a system in which an MCU of the present invention has been connected to an external flash ROM and sensor.

FIG. 1 is a block view of a system in which an MCU 21 of the present embodiment has been connected to an external flash ROM 22 and a sensor 23. In FIG. 1, the flash ROM 22 is a non-volatile memory for storing data. The sensor 23 performs various types of sensing and outputs obtained data Operation clock (CLK) and RESET signals are given to the MCU 21. The MCU 21 and the sensor 23 are connected by the first serial interface, and a chip select signal CS-1 is sent to the sensor 23 from the MCU 21. In a similar manner, the MCU 21 and the flash ROM 22 are connected by the second serial interface, and a chip select signal CS-2 is sent to the flash ROM 22 from the MCU 21.

Figure 2:
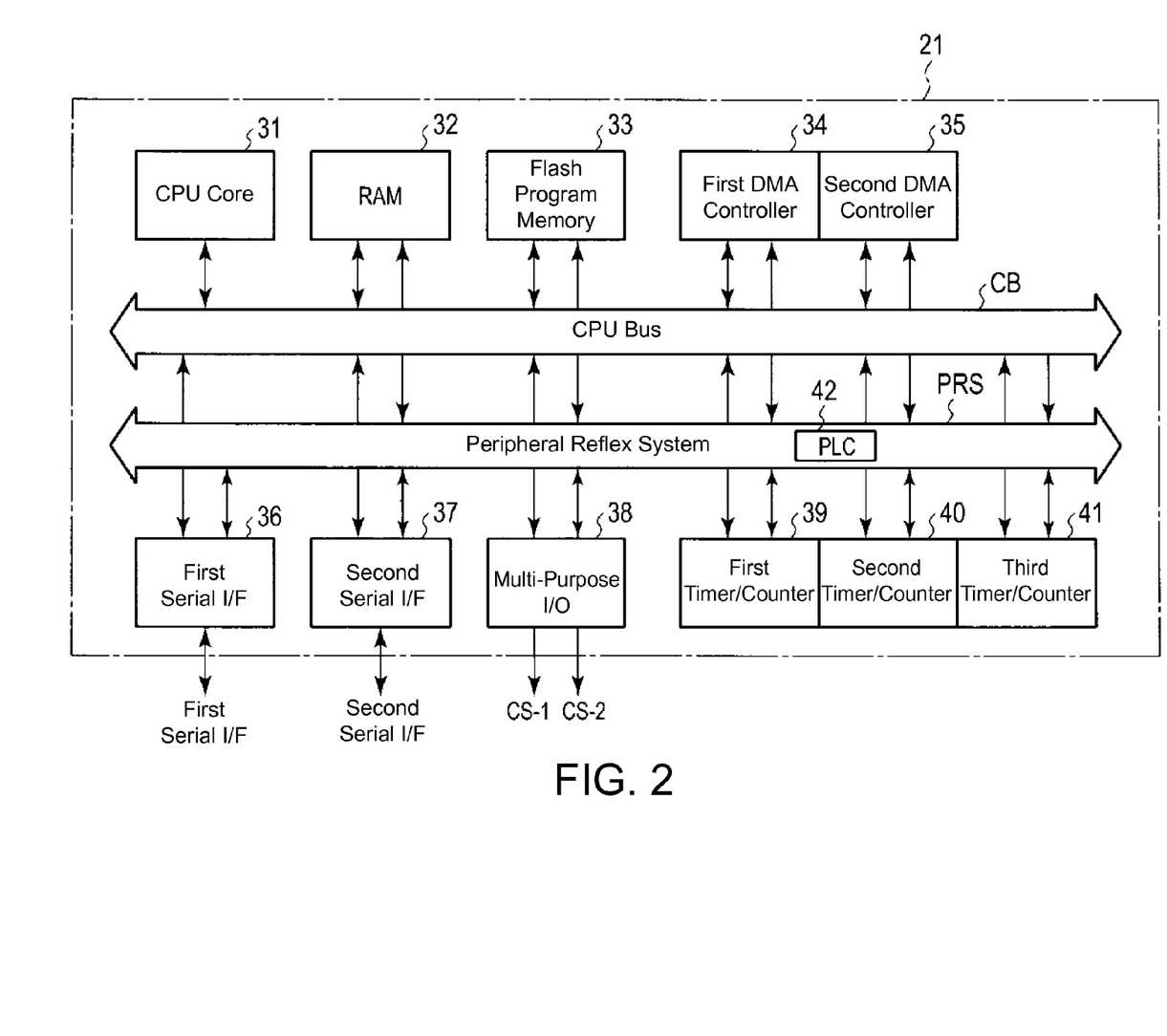
FIG. 2 is a block view of a detailed circuit configuration of the MCU according to the same embodiment.

FIG. 2 is a block view of a detailed circuit diagram of the MCU 21. The MCU 21 includes a CPU core 31, a RAM 32, a flash program memory 33, a first DMA controller 34, a second DMA controller 35, a first serial interface (I/F) 36, a second serial interface (I/F) 37, a multi-purpose interface (I/F) 38, a first timer/counter 39, a second timer/counter 40, and a third timer/counter 41.

These circuits are respectively connected by a CPU bus CB and a peripheral reflex system PRS, which is a peripheral link bus.

The CPU core 31 is a central processing unit that performs various types of computations and processes on the basis of processing programs. The RAM 32 is a work memory that temporarily stores data. The flash program memory 33 is a non-volatile memory that stores the processing programs executed by the CPU 31.

The first DMA controller 34 and the second DMA controller 35 respectively control direct data transfer (DMA) between the peripheral circuits in the MCU 21 and the memory. The first DMA controller 34 controls DMA between the first serial interface 36, which is a peripheral circuit, and the RAM 32. The second DMA controller 35 controls DMA between the second serial interface 37, which is a peripheral circuit, and the RAM 32.

The first serial interface 36 connects to the sensor 23. The second serial interface 37 connects to the flash ROM 22.

The multi-purpose interface 38 outputs chip select signals CS-1 and CS-2 to the sensor 23 and the flash ROM 22.

The first timer/counter 39, the second timer/counter 40, and the third timer/counter 41 are peripheral circuits that function as timers and counters.

The peripheral link controller (PLC) 42, described later, is embedded in the peripheral reflex system PRS. This peripheral link controller 42 receives parameter coincidence signals from the respective peripheral circuits and controls the respective peripheral circuits.

Figure 3:
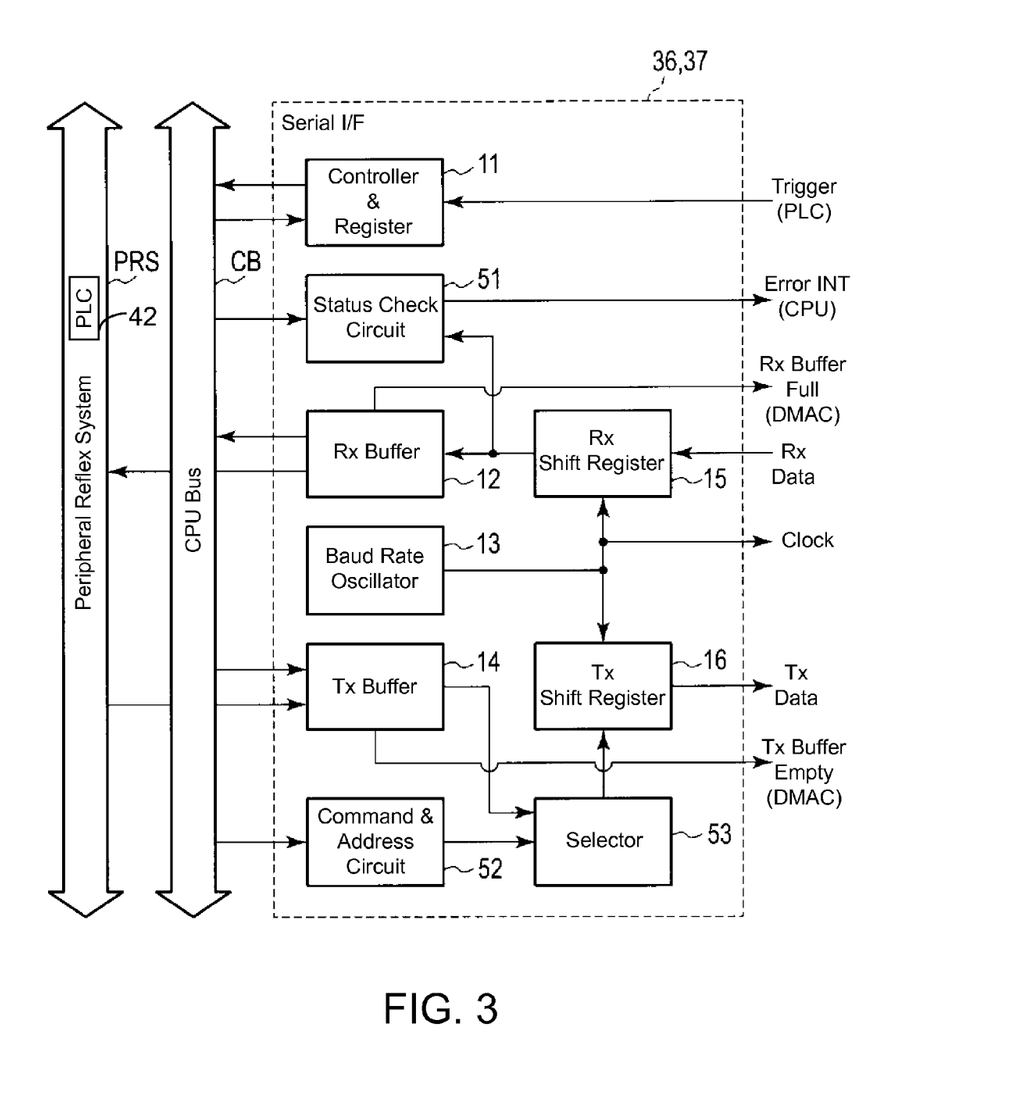
FIG. 3 is a block view of an internal circuit configuration of a serial interface according to the same embodiment.

FIG. 3 is a block view of the inner circuit configuration of the first serial interface 36 and the second serial interface 37, which are both peripheral circuits.

The first serial interface 36 and the second serial interface 37 are used to connect the MCU 21 to an external device such as the flash ROM 22 and the sensor 23, for example.

The first serial interface 36 and the second serial interface 37 include a controller & register 11, an Rx buffer 12, which is a receive buffer, a baud rate oscillator 13, a Tx buffer 14, which is a transmit buffer, an Rx shift register 15 for reception, a Tx shift register 16 for transmission, a status check circuit 51, a command & address circuit 52, and a selector 53.

The controller & register 11 initiates data transfer for the CPU bus CB in accordance with a trigger signal from the peripheral link controller 42.

The operation clock generated by the baud rate oscillator 13 is given to the Rx shift register 15, the Tx shift register 16, and is outputted to outside of this first serial interface 36 or second serial interface 37.

The Rx shift register 15 holds receive (Rx) data and outputs this data to the Rx buffer 12 and the status check circuit 51. The Rx buffer 12 outputs buffer content to the CPU bus CB and the peripheral reflex system PRS, and outputs an Rx buffer full signal to outside of a serial interface 10 when the buffer content becomes full.

Meanwhile, the transmit (Tx) data from the peripheral reflex system PRS or the CPU bus CB is held by the Tx shift register 16 via the Tx buffer 14 and the selector 53 and then outputted to outside of the serial interface 10. When the buffer content becomes empty, the Tx buffer 14 outputs a Tx buffer empty signal to the DMA controllers 34 and 35 outside of the serial interface 10.

In FIG. 3, when a trigger signal is sent to the control & register 11 from the peripheral link controller 42 of the peripheral reflex system PRS, the Rx shift register 15 holds receive (Rx) data from the external device and outputs this data to the Rx buffer 12 and the status check circuit 51.

This status check circuit 51 connects with the CPU bus CB and performs a status check of the external device, and then outputs an error interrupt INT signal to the CPU core 31 when an error is detected.

The command & address circuit 52 connects to the CPU bus CB and outputs required addresses, commands, and the like to the selector 53 before and after data transfer.

The selector 53 selects the output from the Tx buffer 14 and the command & register circuit 52 and causes this to be outputted to the external device in the form of transmit (Tx) data via the Tx shift register 16.

Figure 4:
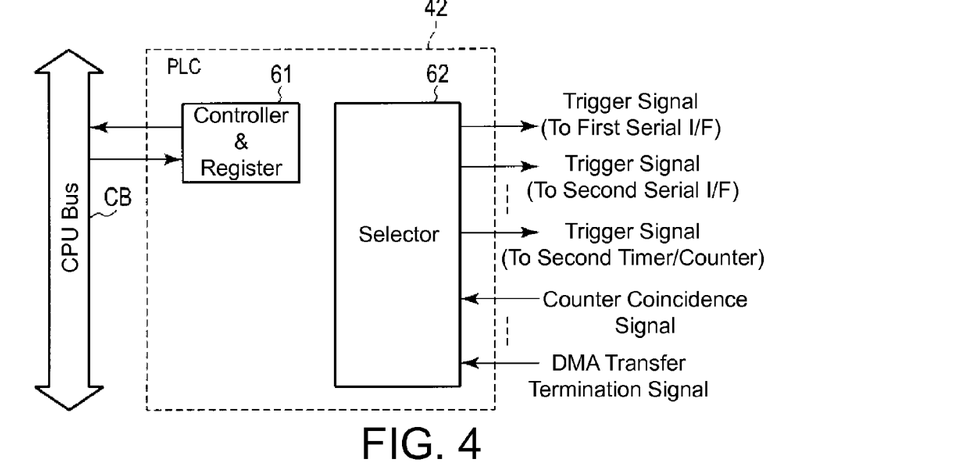
FIG. 4 is a block view of an internal circuit configuration of a peripheral link controller (PLC) according to the same embodiment.

FIG. 4 is a block view of the internal configuration of the peripheral link controller (PLC) 42.

A controller & register 61 is configured by the CPU core 31 via the CPU bus CB. The respective peripheral circuits send counter coincidence signals and DMA transfer termination signals to the selector 62. The selector 62 outputs trigger signals for starting to the respective peripheral circuits in accordance with the register settings of the control & register 61 and the signals from the respective peripheral circuits.

Next, the operation of the above-mentioned embodiment will be described.

Figure 5:
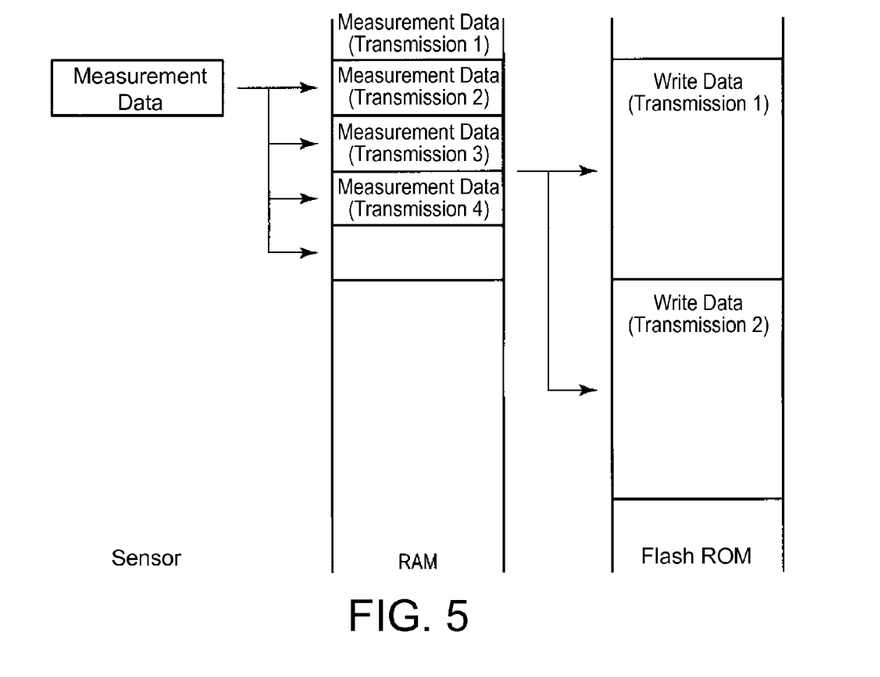
FIG. 5 is the flow of a series of data transmitted and received among the sensor, RAM, and flash ROM.

As shown in FIG. 5, in the present embodiment, measurement data is received from the sensor 23 outside the MCU 21 periodically using a timer, and every time four sets of measurement data are received, the four sets of measurement data are stored in the flash ROM 22 outside of the MCU 21 at once. Then, this data transfer process to the flash ROM 22 is repeated four times.

Figure 6:
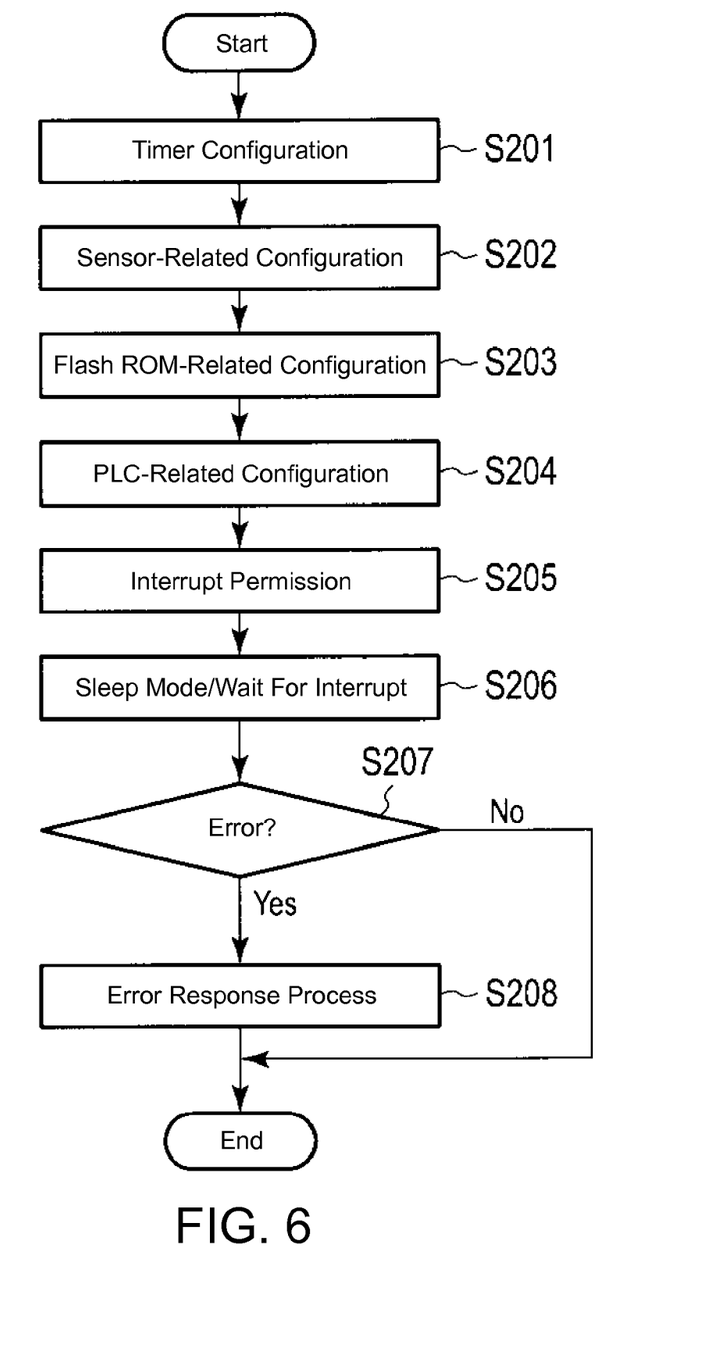
FIG. 6 is a flow chart of processing content for the CPU to detect status abnormalities of external devices.

FIG. 6 is a series of operations for detecting status abnormalities in external devices, which is executed by the CPU core 31 inside the MCU 21 extracting the program read out from the flash program memory 33 in the RAM 32.

Figure 7A:
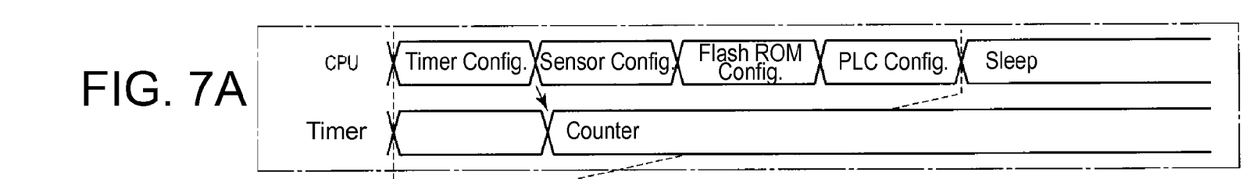
FIGS. 7A to 7D are timing charts of operation timing of inside the MCU and external devices according to the same embodiment.

At the beginning of this process, the CPU core 31 performs timer configuration (step S201), sensor-related configuration (step S202), flash ROM-related configuration (step S203), peripheral link controller (PLC) 42-related configuration (step S204), and interrupt permission configuration (S205). FIG. 7A shows operation timing of the CPU core 31 and the first timer/counter 39, the second timer/counter 40, and the third timer/counter 41 at this time.

If the first timer/counter 39 is set to (1 (second)) with respect to the timer configuration in the step S201, for example, then timer counter termination signals are sent from the first timer/counter 39 to the selector 62 of the peripheral link controller (PLC) 42 every 1 (second).

The counter value of reception frequency is set to (4) for the second timer/counter 40, and a coincidence signal is sent to the selector 62 of the peripheral link controller (PLC) 42 every 4 counts. The counter value of transfer frequency is set to (4) for the third timer/counter 41, and coincidence signals are sent to the selector 62 of the peripheral link controller (PLC) 42 every four counts, which issues an interruption indicating the end to the CPU core 31.

In the sensor-related configuration in step S202, the measurement contents of the sensor 23 and the method of data transfer are configured. At the same time, configuration of the first DMA controller 34 is performed to realize direct memory access between the first serial interface 36 and the RAM 32.

In the flash ROM-related configuration in step S203, flash ROM 22 is initialized. At the same time, configuration of the second DMA controller 35 is performed to realize DMA operation between the second serial interface 37 and the RAM 32.

In the configuration of the peripheral link controller (PLC) 42 in step S204, as shown in FIG. 4, the signals inputted to the selector 62 and the trigger signals outputted therefrom are configured.

Figure 8:
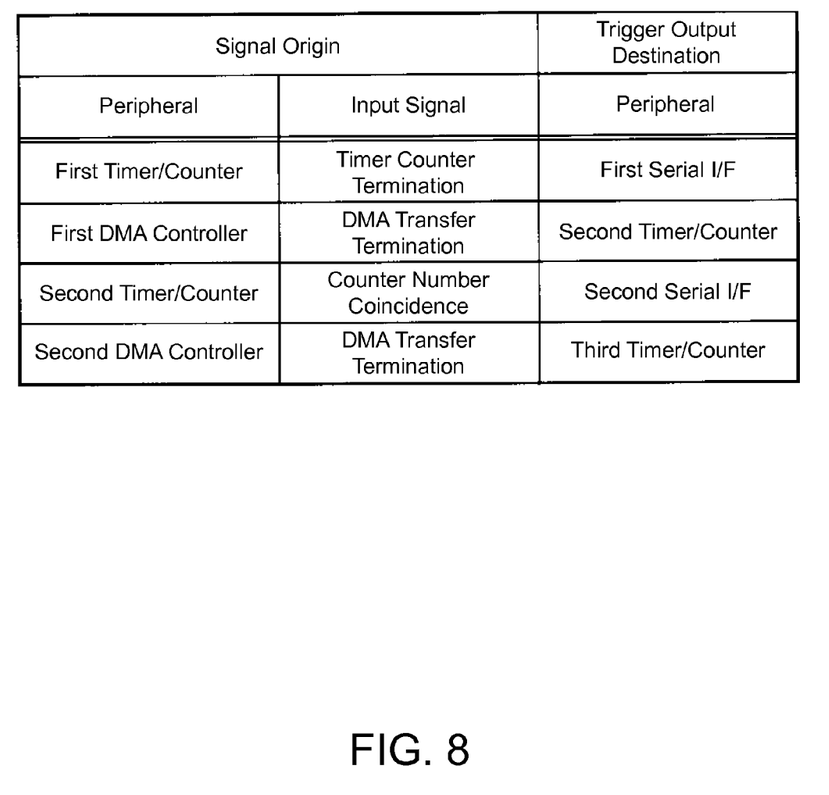
FIG. 8 is a view of the relationship between various types of signal inputs and trigger signal outputs configured for the selector of the same embodiment.

FIG. 8 is a view of the relationship between the input points of the various types of signals and the output point of the trigger signals configured for the selector 62 at this time. The input points of the various signals are defined as the target of the peripheral circuits and the contents of the input signals.

In the configuration of interrupt permission in step S205, permission is set for the interruption indicating the end from the third timer/counter 41 and error interrupt from both the first serial interface 36 and the second serial interface 37.

Figure 7B:
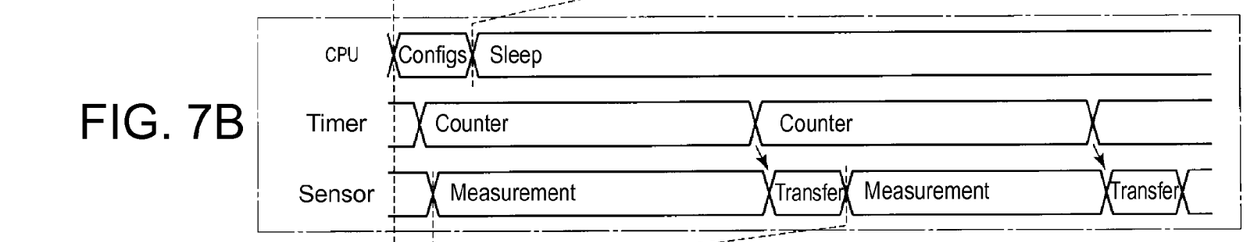

After this series of configurations have ended, the CPU core 31 transitions to sleep mode and waits for an interrupt (step S206). FIG. 7B is operation timing of the CPU core 31, the respective timer/counters 39 to 41, and the sensor 23 at this time.

In other words, the peripheral link controller (PLC) 42 emits a trigger signal in order to start the first serial interface 36 due to the timer counter termination signal from the first timer/counter 39 every 1 (second).

Figure 9A:
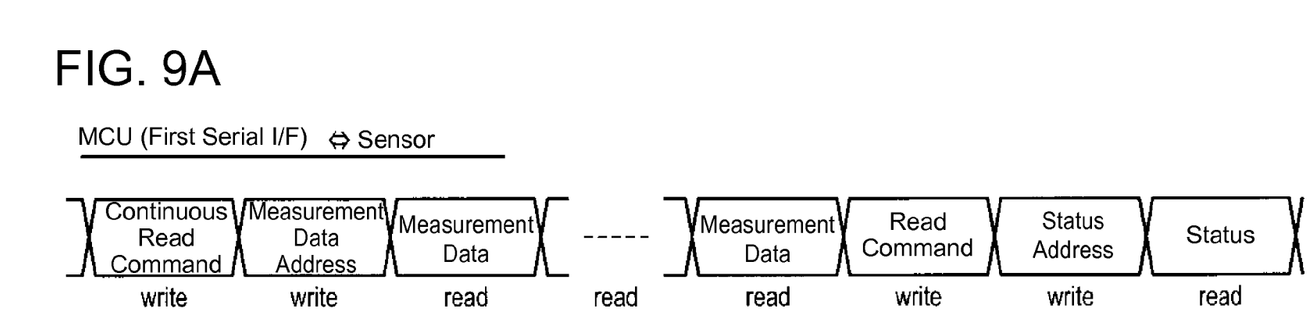
FIGS. 9A and 9B are a protocol that is executed by a first serial interface of the same embodiment.
Figure 9B:
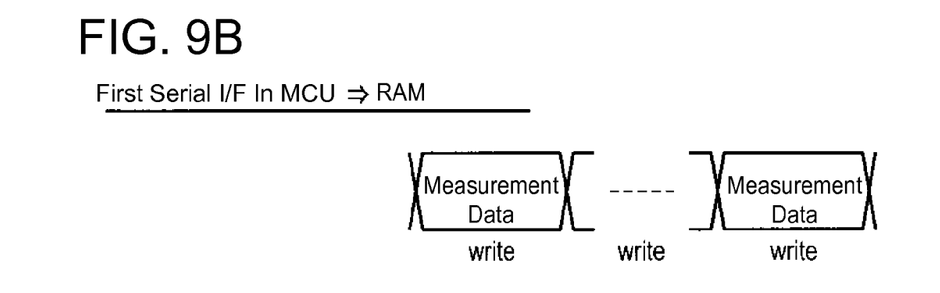

FIGS. 9A and 9B show the protocol executed by the first serial interface 36. The first serial interface 36 transfers the measurement data from the sensor 23 obtained by the procedure shown in FIG. 9A to the RAM 32 and stores it here, as shown in FIG. 9B.

At this time, DMA operation is executed by the first serial interface 36 outputting Rx buffer Full signals to the first DMA controller 34 only during transfer of the measurement data.

The status check circuit 51 inside the first serial interface 36 checks the inputted status after transfer of the measurement data, and issues an interrupt signal to the CPU core 31 if an error has occurred.

If an error has not occurred, the process is terminated, and the CPU waits for the next trigger signal. At this time, the first DMA controller 34 outputs the DMA transfer termination signal to the peripheral link controller (PLC) 42 when DMA operation of a prescribed amount of transfer has ended. Then, in the peripheral link controller (PLC) 42, the trigger signal for counting is outputted to the second timer/counter 40.

When the DMA operation between the first serial interface 36 and the RAM 32 is executed four times and the counter value of the second timer/counter 40 is (4), the second timer/counter 40 issues the counter coincidence signal to the peripheral link controller (PLC) 42. Upon receiving this, the peripheral link controller (PLC) 42 issues the trigger signal for starting to the second serial interface 37.

Figure 7C:
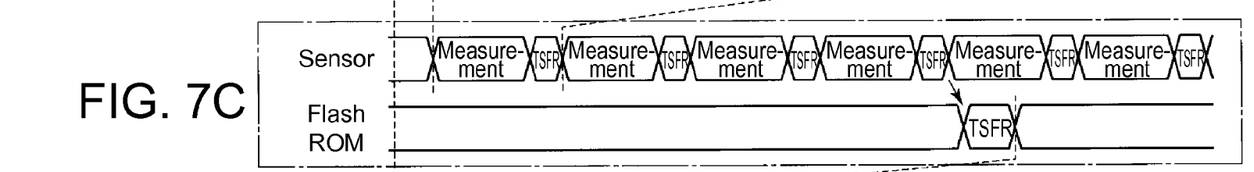
Figure 10A:
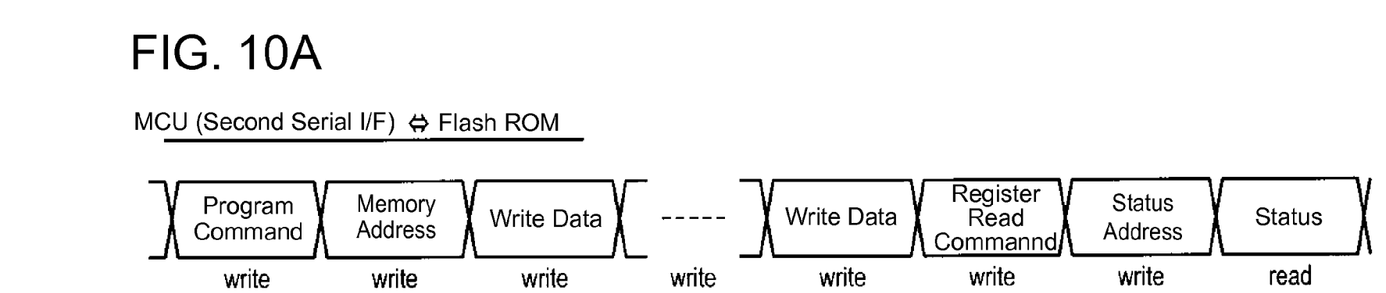
FIGS. 10A and 10B are a protocol that is executed by a second serial interface of the same embodiment.
Figure 10B:
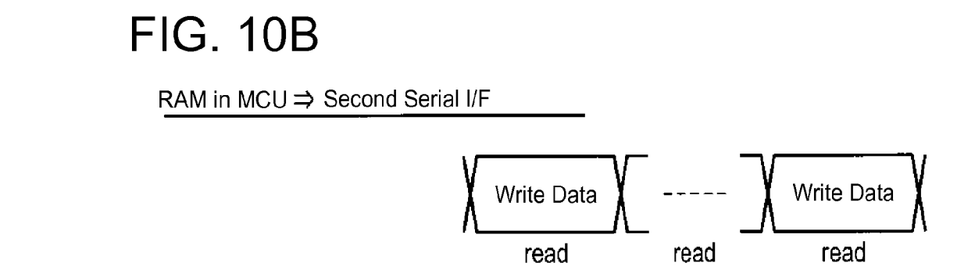

The second serial interface 37 receives the trigger signal from the peripheral link controller (PLC) 42, communicates with the flash ROM 22 outside the CPU core 31 using a protocol such as that shown in FIG. 10A, and then transfers the four sets of measurement data stored in the RAM 32 inside the MCU 21 to the external flash ROM 22, as shown in FIG. 10B. FIG. 7C shows timing of the respective operations executed by the sensor 23 outside the MCU 21 and the flash ROM 22 at this time.

DMA operation is executed by the second serial interface 37 outputting Tx buffer Empty signals to the second DMA controller 35 only during transfer of the measurement data.

The status check circuit 51 inside the second serial interface 37 checks the inputted status after transfer of the measurement data, and issues an interrupt signal to the CPU core 31 if an error has occurred.

If an error has not occurred, the process is terminated, and the CPU waits for the next trigger signal. At this time, the second DMA controller 35 outputs the DMA transfer termination signal to the peripheral link controller (PLC) 42 when DMA operation of a prescribed amount of transfer has ended. In the peripheral link controller (PLC) 42, the trigger signal for counting is outputted to the third timer/counter 41.

Figure 7D:
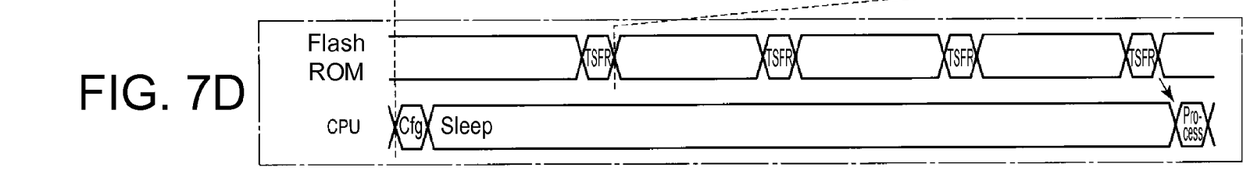

When the DMA operation between the second serial interface 37 and the RAM 32 is executed four times and the counter value of the third timer/counter 41 is (4), the third timer/counter 41 issues a process termination interrupt signal to the CPU 31. FIG. 7D shows transfer operation in the flash ROM 22 outside the MCU 21 and the state of the CPU core 31 inside the MCU 21.

After receiving the interrupt signal, the CPU core 31 verifies the interrupt factor from the content of the signal and, when there is an error (YES in step S207), ends the series of processes in order to execute processes for handling the error (step S208).

In the operations described above, an example was described in which the timer/counters 39 to 41 outside the serial interfaces 36 and 37 are used as counters that count transfer frequency, but a configuration may be used in which the serial interfaces 36 and 37 themselves, which are transfer the data, are provided with internal counters that count the transfer frequency.

In this case, it is no longer necessary to have circuits for counting in the serial interfaces, thereby making it possible to simplify the circuit configuration of the MCU.

In the present embodiment, as described in detail above, the CPU 31 does not need to start the respective peripheral circuits in the MCU 21 or the external devices or perform error processing for each transfer operation, which makes it possible to markedly suppress power consumption of the CPU 31 and to link the operations between the respective peripheral circuits.

Additionally, in the embodiment described above, configuring the termination parameters for the process executed by the peripheral circuit results in a termination parameter coincidence signal being generated when the configured termination parameter has been satisfied. The peripheral circuit that sends this termination parameter coincidence signal has this signal configured by the peripheral link controller (PLC) 42 such that the signal acts as a trigger signal to start the peripheral circuit, thereby linking the start-up of the plurality of peripheral circuits inside the MCU 21 and the devices outside the MCU 21 without going through the CPU core 31. This can significantly reduce power consumption of the CPU core 31.

Furthermore, in the embodiment described above, the configuration of the termination parameters and the peripheral circuits described above are executed by the CPU core 31 at the start of the process on the basis of the operation program stored in the flash program memory 33, thereby making it possible to flexibly change the operation of the MCU 21.

In the embodiment described above, the CPU core 31 itself transitions to sleep mode during data transfer among the plurality of peripheral circuits in the MCU 21 and devices such as the flash ROM 22 and the sensor 23 outside the MCU 21, which makes it possible to significantly reduce power consumption of the CPU core 31 during normal routines.

Various modifications can be made and do not limit the present invention, such as the number of the peripheral circuits such as the serial interfaces, multi-purpose interface, and timer/counters forming the MCU 21, whether or not counter circuits are provided in the serial interfaces, whether or not the peripheral link controller 42 is disposed inside the peripheral reflex system PRS, and the like.

The present invention is not limited to the embodiments described above, and various modifications can be made without departing from the scope thereof. The functions in the embodiments described above may be implemented by being combined together as suitably as possible. Various types of stages can be included in the embodiments described above, and the various types of inventions can be extracted by appropriate combination of the disclosed plurality of configuration requirements. Even if several configuration requirements are removed from the total configuration requirements described in the respective embodiments, this configuration from which these configuration requirements have been removed can be extracted as an invention as long as the effects are able to be obtained.

What is claimed is:

1. A microcontroller device comprising, in one chip:
   a central processing unit;
   a plurality of peripheral circuits configured to execute respective prescribed processes in response to corresponding trigger signals; and
   a peripheral control unit that controls respective activations of the plurality of peripheral circuits,
   wherein at least one of the peripheral circuits is configured to:
      control operation of an external device;
      determine whether or not the operation of the external device is normal;
      output an interrupt signal to the central processing unit to interrupt the central processing unit when the operation of the external device is not normal; and
      output a termination signal to said peripheral control unit, and enter a standby mode to accept a next trigger signal, when a process of said at least one of the peripheral circuits is completed, and
   wherein the peripheral control unit outputs a trigger signal to one of the plurality of peripheral circuits to activate said one of the plurality of peripheral circuits in response to the termination signal outputted by said at least one of the peripheral circuits.

2. The microcontroller device according to claim 1,
   wherein said at least one of the peripheral circuits is configured to output the termination signal when a prescribed termination condition for the process of said at least one of the peripheral circuits is met,
   wherein in the peripheral control unit,
      one of the peripheral circuits to which a trigger signal will be outputted next is selected; and
      the peripheral control unit outputs the trigger signal to the selected one of the plurality of peripheral circuits to activate the selected one of the peripheral circuits in response to the termination signal outputted by said at least one of the peripheral circuits, and
   wherein the activations of the plurality of peripheral circuits in the microcontroller device and control of the operation of the external device are performed without involving the central processing unit when said interrupt signal is not generated by said at least one of the peripheral circuits.

3. The microcontroller device according to claim 2, wherein said termination condition of said at least one of the peripheral circuits and the selected one of the plurality of the peripheral are determined and set by the central processing unit prior to the processes performed by said peripheral circuits.

4. The microcontroller device according to claim 1, wherein the central processing unit is in a sleep mode during operation of the plurality of peripheral circuits when said interrupt signal is not generated.

5. The microcontroller device according to claim 1, wherein upon receiving the termination signal outputted by said at least one of the peripheral circuits, the peripheral control unit forwards said termination signal to the one of the plurality of peripheral circuits as the trigger signal to activate said one of the plurality of peripheral circuits.

6. The microcontroller device according to claim 1, wherein the interrupt signal and the termination signal are outputted through mutually different signal lines.

7. A controlling method for a microcontroller device that has, in one chip, a central processing unit, a plurality of peripheral circuits configured to respectively execute prescribed processes in response to corresponding trigger signals, and a peripheral control unit that controls respective activations of the plurality of peripheral circuits, wherein at least one of the peripheral circuits controls operation of an external device, the control method comprising:
   causing said at least one the peripheral circuits to:
      determine whether or not the operation of the external device is normal;
      output an interrupt signal to the central processing unit to interrupt the central processing unit when the operation of the external device is not normal; and
      output a termination signal to said peripheral control unit, and enter a standby mode to accept a next trigger signal, when a process of said at least one of the peripheral circuits is completed; and
   causing the peripheral control unit to output a trigger signal to one of the plurality of peripheral circuits to activate said one of the plurality of peripheral circuits in response to the termination signal outputted by said at least one of the peripheral circuits.

* * * * *